United States Patent
DiBene, II et al.

(10) Patent No.: US 10,209,767 B2
(45) Date of Patent: Feb. 19, 2019

(54) POWER MANAGEMENT ARCHITECTURE

(71) Applicant: Apple Inc., Cupertino, CA (US)

(72) Inventors: Joseph T. DiBene, II, Santa Cruz, CA (US); David A. Hartley, Sant Cruz, CA (US); Inder M. Sodhi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 15/168,472

(22) Filed: May 31, 2016

(65) Prior Publication Data
US 2017/0220100 A1 Aug. 3, 2017

Related U.S. Application Data

(60) Provisional application No. 62/289,995, filed on Feb. 2, 2016.

(51) Int. Cl.
  *G06F 1/32* (2006.01)
  *G06F 9/32* (2018.01)
  *G06F 9/38* (2018.01)

(52) U.S. Cl.
  CPC .......... *G06F 1/3296* (2013.01); *G06F 1/324* (2013.01); *G06F 1/3237* (2013.01); *G06F 9/3869* (2013.01); *Y02D 10/128* (2018.01); *Y02D 10/172* (2018.01)

(58) Field of Classification Search
  CPC .................................................. G06F 9/3869
  See application file for complete search history.

(56) References Cited

U.S. PATENT DOCUMENTS

| | | |
|---|---|---|
| 6,233,690 B1 | 5/2001 | Choi et al. |
| 6,247,134 B1 | 6/2001 | Sproch et al. |
| 6,907,534 B2 | 6/2005 | Ku |
| 7,266,707 B2 | 9/2007 | Ngo et al. |
| 9,218,048 B2 | 12/2015 | Eastlack |
| 2003/0056127 A1 | 3/2003 | Vaglica |

(Continued)

OTHER PUBLICATIONS

PCT/US2017/012942, International Search Report and Written Opinion, dated Apr. 5, 2017, 17 pages.

(Continued)

*Primary Examiner* — Kim Huynh
*Assistant Examiner* — Joshua Neveln
(74) *Attorney, Agent, or Firm* — Meyertons, Hood, Kivlin, Kowert & Goetzel, P.C.; Lawrence J. Merkel

(57) ABSTRACT

In one embodiment, an integrated circuit includes a power management architecture in which one or more pipelines are actively powered and clocked when data is provided for processing, but which are clock gated and in retention when there is no data to be processed. When data is provided to the pipeline, supply voltage may be actively provided to initial stages of the pipeline and the clocks may be ungated when the voltage is stable enough for operation. Subsequent stages of the pipeline may be sequentially provided power and clocks as the data progresses through the pipeline. Initial stages may be clock gated and power may be deactivated when additional data is not provided for processing. Accordingly, when the pipeline is viewed as a whole, power may be seen as rolling forward ahead of the data processing, and power may be inhibited in a similar rolling fashion.

18 Claims, 5 Drawing Sheets

(56) References Cited

U.S. PATENT DOCUMENTS

| | | |
|---|---|---|
| 2004/0221185 A1 | 11/2004 | Bose et al. |
| 2009/0172452 A1* | 7/2009 | Kong .................... G06F 9/3871 |
| | | 713/330 |
| 2012/0066530 A1 | 3/2012 | Suzuki et al. |
| 2013/0099570 A1 | 4/2013 | Manohar et al. |
| 2015/0177823 A1 | 6/2015 | Maiyuran et al. |

OTHER PUBLICATIONS

Jens Muttersbach et al.; "Practical Design of Globally-Asynchronous Locally-Synchronous Systems"; Proceedings Sixth International Symposium on Advanced Research in Asynchronous Circuits and Systems (ASYNC 2000) (Cat. No. PR00586) Apr. 2-6, 2000, 12 pages.

* cited by examiner

POWER MANAGEMENT ARCHITECTURE

This application claims benefit of priority to U.S. Provisional Patent Application Ser. No. 62/289,995, filed Feb. 2, 2016. The above application is incorporated herein by reference in its entirety. To the extent that any of the incorporated material conflicts with material expressly set forth herein, the material expressly set forth herein controls.

BACKGROUND

Technical Field

Embodiments described herein are related to power management in integrated circuits.

Description of the Related Art

Integrated circuits are a key component of most mobile devices, such as smart phones, personal digital assistants, tablet computers, laptop computers, etc. Mobile devices are often operated from a limited energy source such as a battery. Accordingly, energy efficiency (e.g. efficient power consumption) is an important metric of integrated circuits.

Power consumption includes both dynamic power consumption and leakage power consumption. Dynamic power is consumed in the operation of the circuitry in the integrated circuit to perform the functions for which the integrated circuit is designed. For example, digital logic circuitry switching from binary zero to binary one, and vice versa, consumes power. Leakage power is consumed due to physical device effects, in which a certain amount of current is "leaking" through the physical structure of transistors when the transistors are "off" (not actively conducting current in response to the control terminals of the transistors). Leakage current occurs whenever the circuitry is powered on and is proportional to the power supply voltage provided to the integrated circuit as well as other factors such as temperature. As semiconductor fabrication technology has continued to shrink the feature sizes of transistors, leakage power consumption has increased as a percentage of total power consumption.

SUMMARY

In one embodiment, an integrated circuit includes a power management architecture in which one or more pipelines are actively powered and clocked when data is provided for processing, but which are clock gated and in retention (or have an unregulated power supply) when there is no data to be processed. The supply voltage may be permitted to float down to the retention voltage, which may reduce leakage power consumption due to the reduced voltage and due to a lack of active regulation of the supply voltage (preventing additional current draw from the energy source while the pipeline is idle). Some pipelines may not require retention and the supply voltage may be allowed to float to ground. The clock gating may reduce power consumption in the clock tree and may prevent spurious power consumption in the pipeline if inputs change but data is not actually being provided for processing.

When data is provided to the pipeline, supply voltage may be actively provided to initial stages of the pipeline and the clocks may be ungated when the voltage is stable enough for operation. Subsequent stages of the pipeline may be sequentially provided power and clocks as the data progresses through the pipeline. Initial stages may be clock gated and power may be deactivated when additional data is not provided for processing. Accordingly, when the pipeline is viewed as a whole, power and clocking may be seen as rolling forward ahead of the data processing, and power/clocking may be inhibited in a similar rolling fashion. Leakage power consumption and clock power consumption may be reduced. Power and clock may be viewed as being provided "just in time" to the pipeline stages as the processing demand warrants.

BRIEF DESCRIPTION OF THE DRAWINGS

The following detailed description makes reference to the accompanying drawings, which are now briefly described.

Figure 1:
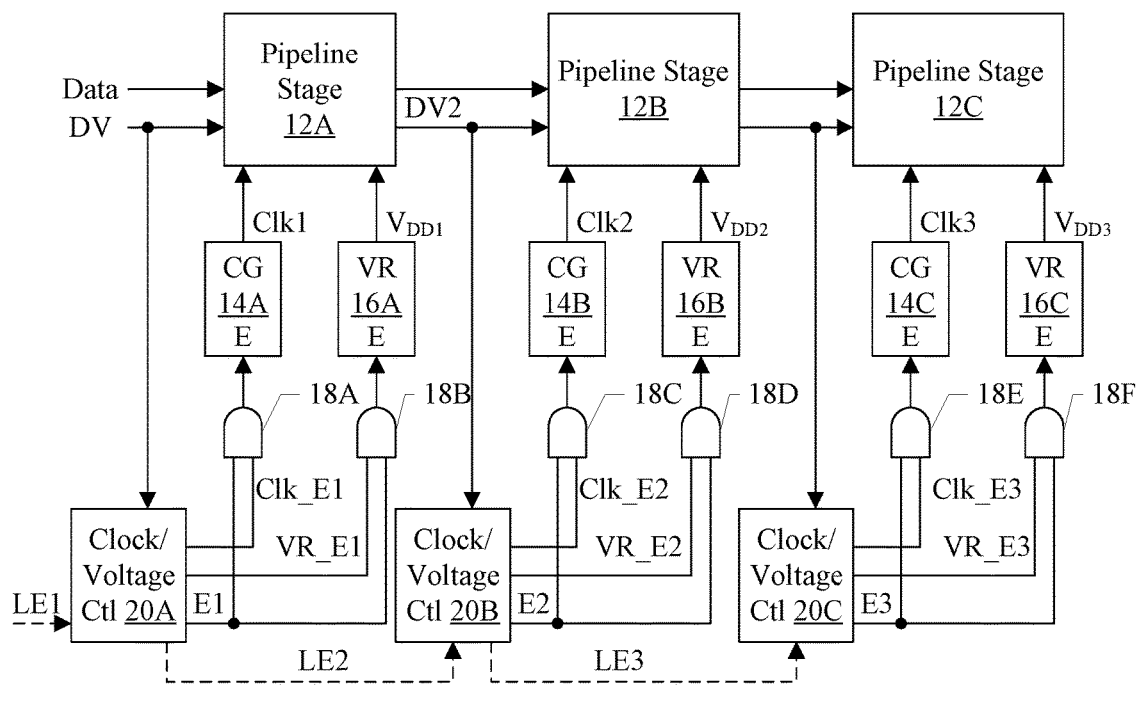
FIG. 1 is a block diagram of one embodiment of a pipeline.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment a pipeline 10 including pipeline stages 12A-12C is shown. The pipeline stage 12A is coupled to input data and a corresponding activity signal (e.g. a data valid, or "DV," signal in FIG. 1) that indicates whether or not data is provided for the pipeline 10 to process. The pipeline stage 12A is coupled to the pipeline stage 12B, which is further coupled to the pipeline stage 12C. More particularly, pipeline stage 12B may have its input coupled to the output of the pipeline stage 12A, and the pipeline stage 12C may have its input coupled to the output of the pipeline stage 12B. Thus, the pipeline stages 12A-12C may operate on the input data sequentially.

Each pipeline stage 12A-12C is coupled to a respective clock gater (CG) circuit 14A-14C and a respective voltage regulator (VR) circuit 16A-16C. The CG circuits 14A-14C provide respective clocks Clk1 to Clk3 to the pipeline stages 12A-12C, and the VR circuits provide respective power supply voltages $V_{DD1}$ to $V_{DD3}$ to the pipeline stages 12A-12C. The CG circuits 14A-14C and the VR circuits 16A-16C receive enables ("E" inputs) from enable circuits 18A-18F, as shown in FIG. 1 (represented by AND gates in FIG. 1). The enable circuits 18A-18F are coupled to respective clock/voltage control circuits 20A-20C, which are coupled to the activity signals input to each respective pipeline stage 12A-12C (e.g. the DV signal input to the pipeline stage 12A is received by the clock/voltage control circuit 20A, and corresponding activity signals from previous pipeline stages may be received by the pipeline stages 12B-12C).

The clock voltage/control circuits 20A-20C may be configured to sequence the power and clock enables for the pipeline stages 12A-12C, respectively, to power the pipeline stages 12A-12C and provide clocking to the pipeline stages 12A-12C in response to activity on the inputs (e.g. assertion of the DV signal to the pipeline stage 12A). For example, the clock voltage/control circuits 20A-20C may delay the clock enable with respect to the voltage regulator enable to permit the corresponding supply voltage to increase enough that the pipeline stages 12A-12C will operate properly at the operating frequency of the clock.

The delay between enabling the VR circuits 16A-16C and enabling the CG circuits 14A-14D may be relatively short (e.g. on the order of microseconds). Generally, the relationship of delay, voltage, capacitance in the pipeline stages 12A-12C, and the current from the VR circuits 16A-16C. The equation relating these items is shown as equation 1 below:

$$dt = C_{pipeline} * (V_{operation} - V_{retention})/i_{VR} \qquad (1).$$

In embodiments in which the pipeline stages 12A-12C are stages within an integrated circuit block, $C_{pipeline}$ may be on the order of 1-500 microfarads, and more particularly on the order of less than 100 microfarads, and in some embodiments on the order of 3-4 microfarads; $V_{operation}$ may be on the order of 500-600 mV; $V_{retention}$ may be on the order of 400 mV; and $i_{VR}$ may be on the order of hundreds of microamps to a few amps. Other embodiments may implement larger collections of circuitry as a pipeline stage circuit (e.g. blocks of an integrated circuit, components of a system on a chip (SOC), or even multiple integrated circuits in a system).

The supply voltage may be maintained at the retention voltage that permits state to be retained in storage devices in the pipeline stages 12A-12C, if the pipeline stages 12A-12C retain state from clock cycle to clock cycle. That is, the retention voltage may be sufficient for the storage elements (e.g. cross-coupled inverters) to retain the stored data in the presence of noise, leakage currents, and other variables, but not sufficient to permit operation of the circuitry in the pipeline stages 12A-12C at speed. In an embodiment, the VR circuits 16A-16C may pulse energy into the pipeline stages as the voltage falls to the retention voltage, ensuring that enough energy remains in the supply to remain above the retention voltage. If the pipeline stage does not retain state, the VR circuits 16A-16C may permit the supply voltage to float to any voltage level when not enabled.

In an embodiment, the VR circuits 16A-16C may include any circuitry configured to regulate the output voltage ($V_{DD1}$ to $V_{DD3}$). The VR circuits 16A-16C may include various energy storage components such as combinations of inductors and capacitors to store energy from an external supply to be provided to the receiving circuits 12A-12C to ensure that the output voltage is maintained. When the enable to the VR circuits 16A-16C is deasserted, the VR circuits 16A-16C may cease attempting to regulate the voltage. For example, the VR circuits 16A-16C may remain active, but may tristate the voltage output or otherwise disable current flow to the voltage output. Alternatively, the VR circuits 16A-16C may disable some internal circuitry that may quickly be reactivated when the VR circuits 16A-16C are re-enabled, and/or may pulse the voltage as the voltage falls to the retention voltage, as discussed above. In an embodiment, the power architecture described herein may be particularly suitable for on-die VR circuits 16A-16C, although any level of integration may be supported. In other embodiments, the VR circuits 16A-16C may be power switches that control the connection between a global power supply and a local power supply to the corresponding pipeline stages 12A-12C.

The CG circuits 14A-14C may be any circuits that receive an input clock and enable, and are configured to output the input clock in response to an asserted enable and output a constant level (e.g. low) in response to a deasserted enable. The constant level may be a level at which receiving clocked storage devices are configured to hold their present values independent of activity on the inputs to the clocked storage devices.

In the illustrated embodiment, the clock voltage control circuits 20A-20C may output an enable (E1 to E3) along with a clock enable (Clk_E1 to Clk_E3) and a VR enable (VR_E1 to VR_E3). The enable circuits 18A-18F may combine the enables to generate the enables for the clock gater circuits 14A-14C and the VR circuits 16A-16C. The enable circuits 18A-18F may be part of the voltage/clock control circuit 20A, but are shown separately for illustration in FIG. 1. Furthermore, the clock/voltage control circuits 20A-20C may generate the enables E1 to E3, and may generate the enables for the CG circuits 14A-14C and the VR circuits 16A-16C directly.

Each pipeline stage 12A-12C may be configured to process its input data to produce output data for the next stage. Several examples of pipelines for various components are illustrated in FIGS. 3 to 7 and described in more detail below. In general, any digital operation may be pipelined. A given pipeline stage 12A-12C may perform its operation over one clock cycle, capturing a result of the operation in one or more clocked storage devices to propagate to the next pipeline stage.

In another embodiment, the pipeline stages 12A-12C may represent groups of stages that may be clock gated and powered as a group. Such stages may share a CG circuit 14A-14C and a VR circuit 16A-16C. However, the number of stages that may be grouped is a tradeoff with the delay in restoring the voltage to a level that will permit correct operation of the pipeline stages. More generally, a pipeline stage circuit may be a circuit that includes at least one pipeline stage, and may include more than one pipeline stage. As mentioned above, pipeline stage circuits may further include blocks of an integrated circuit, components of a system on a chip (SOC), or even multiple integrated circuits in a system. The pipeline stage circuit may have a corresponding CG circuit and VR circuit.

In an embodiment, power may be restored to the pipeline stages 12A-12C and processing of input data may be performed without requiring initialization of the pipeline stages 12A-12C. As previously mentioned, the disabled VR circuits 16A-16C may permit the voltages $V_{DD1}$ to $V_{DD3}$ to float down to the retention voltage if the pipeline stages 12A-12C retain state. Alternatively, the disabled VR circuits 16A-16C may permit the voltage $V_{DD1}$ to $V_{DD3}$ to float to any level if state is not retained in the pipeline stages 12A-12C.

The DV signal shown in FIG. 1 may be one mechanism for indicating that there is activity for the pipeline (e.g. data to be processed). The DV signal may be asserted to indicate valid and deasserted to indicate not valid. In other embodiments, activity may be indicated in other ways. For example, the clock/voltage control circuits 20A-20C may be configured to decode multi-bit values to detect that there is activity. For example, the input data may include commands identifying processing to perform, and the clock/voltage control circuits 20A-20C may decode the commands. In some embodiments, the DV signal may be a prediction transmitted in advance of the data, so that the pipeline may be powered up and ungated prior to data arrival. In other embodiments, stalling may be used until the pipeline is ready to receive the data.

In one embodiment, the clock/voltage control circuits 20A-20C may receive and generate lookahead enables (LE1-LE3) in FIG. 1. The lookahead enables may be asserted ahead of the DV signals, to permit power regulation and/or clock enabling to precede the arrival of data for processing. The lookahead enables may be used to prevent a supply voltage from decreasing more than a desired amount, to avoid level shifting issues between voltage domains, etc. In other embodiments, each of the lookahead enables LE1 to LE3 may be received from external control circuitry, rather than propagated between the control circuits 20A-20C as shown in FIG. 1. In still other embodiments, a combination of external propagated and external lookahead enables may be implemented. Similarly, in some embodiments, DV inputs to various pipeline stages may be provided from external circuitry.

This description may refer to various signals as being asserted and deasserted. Generally, a signal may be asserted if it is in a state that indicates the desired condition described by that signal (e.g. valid, or enabled) and may be deasserted if it is in a state that indicates the desired condition is not present (e.g. invalid, or disabled). A signal may be asserted high and deasserted low. Alternatively, a signal may be asserted low and deasserted high.

Figure 2:
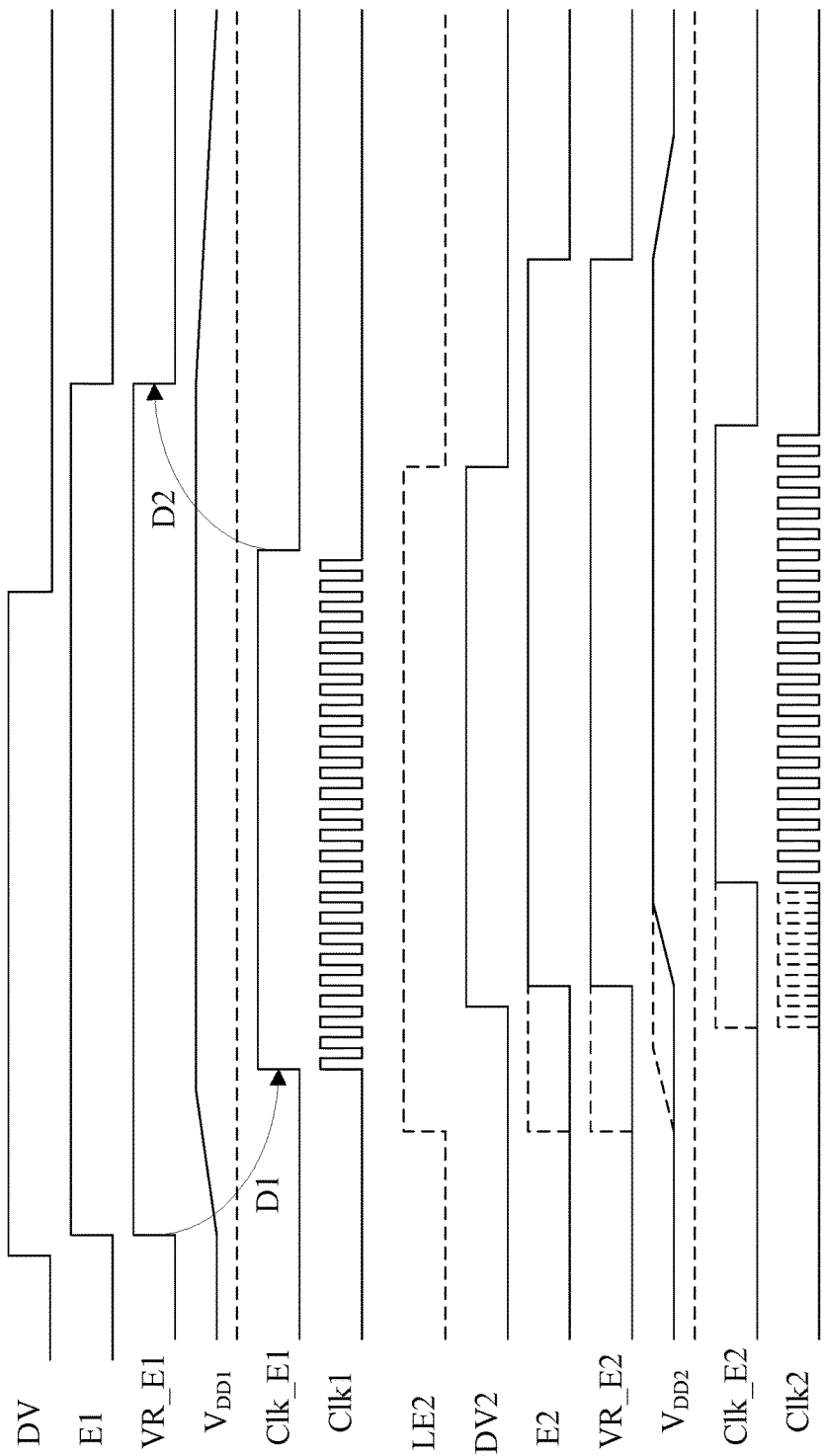
FIG. 2 is a timing diagram illustrating operation of one embodiment of the pipeline shown in FIG. 1.

FIG. 2 a timing diagram is shown illustrating one embodiment of operation of the pipeline 10 shown in FIG. 1. Signals for the pipeline stages 12A-12B are shown in FIG. 2. Time increases from left to write in FIG. 2, but may not be to scale. For example, the rise and fall of the VDD1 voltage may not be to scale with the rest of the time (e.g. the period of the clock signals in FIG. 2), and may be shorter or longer in other embodiments.

The DV input to the pipeline stage 12A is asserted in FIG. 2, indicating that data is being provided for processing. The DV input remains asserted for a number of clock cycles, indicating that a stream of data is being provided. Once the data is exhausted, the DV input is deasserted again.

Responsive to the assertion of the DV input, the clock/voltage control circuit 20A may assert the enable (E1) and VR enable (VR_E1). As illustrated in FIG. 2, the $V_{DD1}$ voltage is initially at the retention voltage above ground (where the ground voltage is illustrated as the dotted line in FIG. 2). The $V_{DD1}$ voltage begins rising to the operational level. A delay D1 later, where D1 is determined based on the amount of time elapsing for the $V_{DD1}$ voltage to rise high enough for operation, the clock/voltage control circuit 20A may assert the clock enable (Clk_E1). The clock begins oscillating and remains oscillating until the data that is being provided to the pipeline stage 12A is exhausted and processed through the pipeline stage 12A. The clock/control circuit 20A then deasserts the clock enable Clk_E1, and waits a delay D2 to ensure that the $V_{DD1}$ voltage has settled. If the VR circuit 16A were immediately disabled, the sudden change in current could cause overshoot due to ringing at resonant frequencies of the package impedances and other impedances. But gracefully disabling the clocks and allowing the VR circuit 16A to dampen out any transients, such overshoot may be reduced/minimized. At the expiration of D2, the VR_E1 is deasserted and the $V_{DD1}$ voltage begins to float down.

Similarly, the initial data produced by the pipeline stage 12A is transmitted out and the DV2 signal input to the clock/voltage control circuit 20B is asserted. The E2, VR2, and Clk_E2 signals follow a similar pattern, overlapped with the signals for the pipeline stage 12A. Thus, power and clock enables progress down the pipeline in overlapping fashion, "rolling" the power and clock along with the data. It is noted that different pipeline stages 12A-12C may have different loads, and thus the delay D1 may be different for each pipeline stage.

As mentioned previously, in some embodiments a lookahead enable may be supported in one more stages. FIG. 2 illustrates the use of LE2 to assert VR_E2 early (dotted lines in FIG. 2), so that the enable of the Clk2 may align with the arrival of the data valid DV2 for the stage 12B (dotted lines in FIG. 2). Thus, there may be no delay in the processing of data provided from stage 12A to stage 12B.

FIGS. 3-7 are example pipelines of various types which may implement the rolling power mechanism discussed above. The stages of the pipelines may thus be equipped with CG circuits, VR circuits, and clock/voltage control circuits similar to those shown in FIG. 1. The CG circuits, VR circuits, and clock/voltage control circuits are not expressly shown in FIGS. 3-7 to simplify the drawings. However, it is understood that each stage may include those circuits (or at least those stages which are clock gated and in retention when not actively processing data may include CG and VR circuits, in embodiments in which some stages do not support clock gating/retention).

Figure 3:
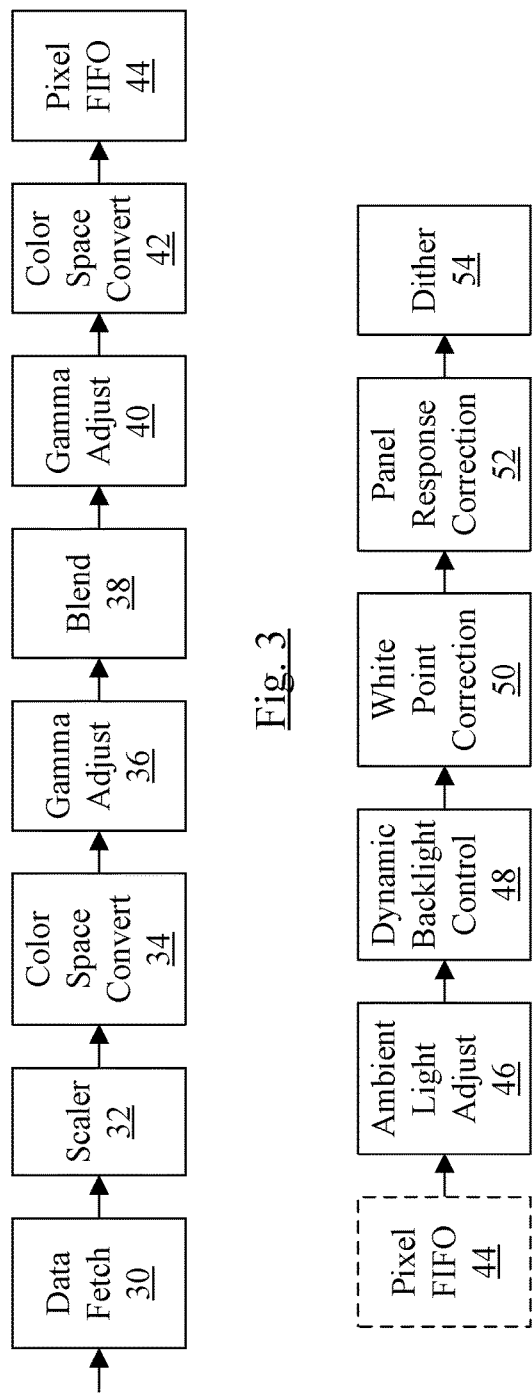
FIG. 3 is a block diagram of one embodiment of a portion of a display controller pipeline.

FIG. 3 is a block diagram of one embodiment of a front end of a display controller pipeline. The pipeline in FIG. 3 includes a data fetch stage 30, scaler stage 32, color space conversion stage 34, gamma adjust stage 36, blend stage 38, gamma adjust stage 40, color space conversion stage 42, and a pixel first in, first out (FIFO) buffer 44. The stages 30-42 and buffer 44 are coupled in series as shown in FIG. 3.

The data fetch stage 30 includes circuitry configured to fetch image data from a frame buffer in memory. While the data is being fetched, the remaining stages 32-44 may be idle and thus may be clock gated by the CG circuit and power may be floating from the VR circuit. Once enough data is fetched for the scaler to operate (e.g. multiple lines, or rows, of pixels from the frame buffer), the scaler stage 32 may be activated. The scaler stage 32 may scale the image in two dimensions, if desired. The scaled image may optionally be converted from red-green-blue (RGB) color space to YCrCb color space for blending with an image or video sequence in the color space convert stage 34. An optional gamma adjustment stage may be used to apply a gamma adjustment to the image prior to blending (gamma adjust stage 36). The blend stage 38 may blend the image pixels with pixels from another image or video sequence (optionally), and a post blend gamma adjustment (stage 40) and/or color space conversion (stage 42) may be performed if desired. The result pixels may be written to the pixel FIFO 44.

Accordingly, at least the stages 32 to 42 may implement the rolling power mechanism described herein while data is being fetched from the memory. As pixels arrive, the power may be restored to the stages 32-42 in sequence and the clocks may be ungated in sequence as well.

Figure 4:
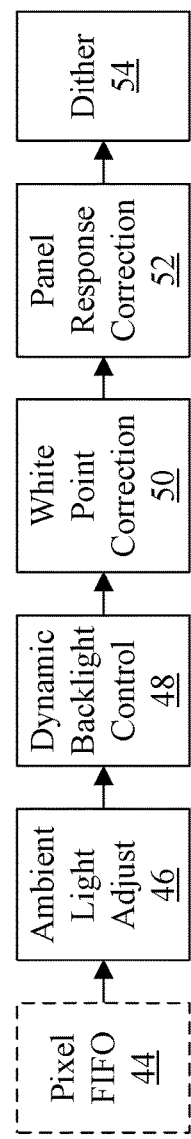
FIG. 4 is a block diagram of one embodiment of a portion of a display controller pipeline.

FIG. 4 is a block diagram of one embodiment of a back end of a display controller pipeline. The back end may have the pixel FIFO 44 as an input, and may include ambient light adjustment stage 46, dynamic backlight control stage 48, white point correct stage 50, panel response stage 52, and dither stage 54. The buffer 44 and stages 46-54 are coupled in series as shown in FIG. 4.

As mentioned previously, the pixel FIFO 44 may be a buffer for pixels between the front end and the back end of the display pipeline. Accordingly, the back end of the pipeline may be clock gated and in retention until the pixels in the pixel FIFO 44 reach a certain level (e.g. a watermark, or level of fullness, of the pixel FIFO 44). Accordingly, the pixel FIFO 44 reaching the desired level may be the activity indicator (DV) to cause the back end pipeline to restore power and clock for processing according to the rolling power mechanism described above. Additionally, a somewhat lower level in the pixel FIFO 44 may be used to generate the lookahead enable, allowing voltage to ramp up as the pixel FIFO 44 approaches the level at which the DV is to be asserted.

The ambient light adjust stage 46 may adjust the contrast of the pixels based on input from an ambient light sensor that detects ambient light around the device having the display that is controlled by the display controller (e.g. increase contrast in bright ambient light settings and decreasing contrast in dim ambient light settings). The dynamic backlight control stage 48 may conserve display power by dynamically adjusting pixel transmittance and backlight level. The white point correction stage 50 may apply corrections to pixels to adjust for panel variations, which may result from per unit variations and/or temperature variations. The panel response correction stage 52 may correct for panel response. The dither stage 54 may apply dithering to the final image for display. It is noted that, in another embodiment, the pixel FIFO 44 may be at the end of the back end shown in FIG. 4 instead of between the front end and the back end as shown in FIGS. 3 and 4. In such an embodiment, the pipelines of FIGS. 3 and 4 may be part of the same pipeline stage circuit.

Figure 5:
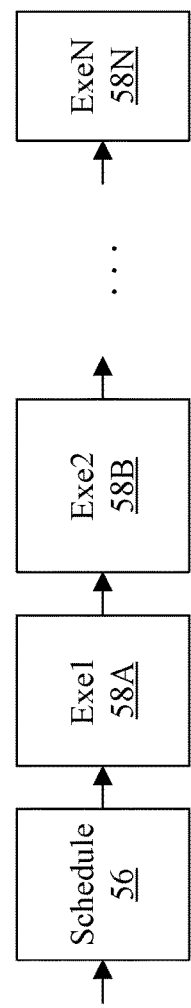
FIG. 5 is a block diagram of one embodiment of a portion of a general purpose processor pipeline.

FIG. 5 is a block diagram of one embodiment of a portion of a general purpose processor pipeline (e.g. a central processing unit (CPU) pipeline). The portion illustrated in FIG. 5 includes a scheduler stage 56 followed by multiple execution stages Exe1 58A to ExeN 58N. The stages 56 and 58A-58N are coupled in series as shown in FIG. 5.

Instructions (or instruction operations decoded from instructions) may be queued in the scheduler stage 56 until operands of the instruction operations are available. Instruction operations that are ready for execution may then be scheduled to an execution unit that is designed to execute the operation. Various execution units may have an execution pipeline, and different execution units may have pipelines of different lengths, from a few as one stage for integer arithmetic and logical operations, for example, to multiple stages for floating point or vector media operations. If a given execution unit is idle, its stages 58A-58N may be clock gated and in retention. In response to scheduling an instruction, the stages 58A-58N may be restored via the rolling power architecture described above and may execute the instruction. When idle again, the execution stages 58A-58N may again be clock gated and in retention.

Figure 6:
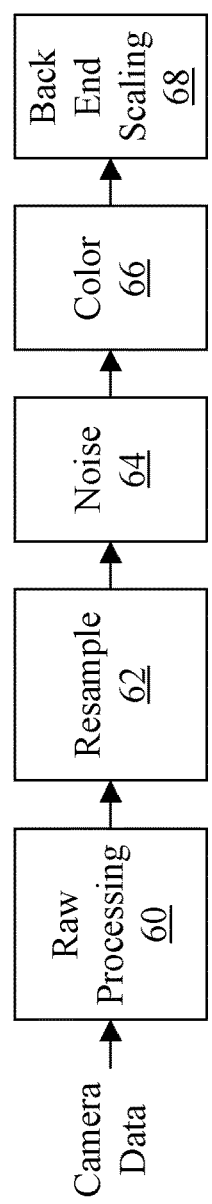
FIG. 6 is a block diagram of one embodiment of a portion of an image signal processor pipeline.

FIG. 6 is a block diagram of one embodiment of a portion of an image signal processor (ISP) pipeline. The portion illustrated in FIG. 6 includes a raw processing stage 60, a resample stage 62, a noise stage 64, a color space processing stage 66, and a back end scaling stage 68. The stages 60 to 68 are coupled in series as shown in FIG. 6.

The ISP pipeline may process image information from a camera or other image sensor into image information usable by other components of a system such as a display. In one embodiment, the stages of the ISP pipeline may process camera data at different rates. For example, in the example embodiment illustrated in FIG. 6, the image signal processor may implement one or more front end pipeline stages such as the raw processing stage 60 and the resample stage 62, which process camera data at an initial rate. Thus, the various different techniques, adjustments, modifications, or other processing operations performed at these front-end pipeline stages (such as those described below with respect to the raw processing stage 60 and the resample stage 62) may be implemented so that the image data may be continuously processed through these stages at the initial rate. One or more back end pipeline stages may process data at a different rate. The back end pipeline stages may, in various embodiments, process image data at a reduced rate that is less than the initial data rate. For example, as illustrated in FIG. 6, the back end pipeline stages may include the noise stage 64, color processing stage 66, and the back end scaling stage 68. The result of the front end stages may be written to memory for buffering into the back end stages.

Accordingly, the front end stages may be clock gated and in retention during times that camera data is not being received. The back end may be clock gated and in retention until enough data is buffered in memory for processing.

In an embodiment, the raw processing stage 60 may implement a variety of modules, units, or components to perform various operations, functions, or tasks on raw image data. Bayer raw format, for example, may be image data collected from image sensor(s) that implement a Bayer pattern of pixel sensors. For instance, some pixel sensors only capture green light, while other pixel sensors capture red or blue light in Bayer pattern of pixels. In this way, image data in Bayer raw image format (or other raw image format captured by a color filter array in an image sensor) provides pixel data with values specific to a particular color (instead of all colors). The raw processing stage 60 may applying various operations including, but not limited to, sensor linearization, black level compensation, fixed pattern noise reduction, defective pixel correction, raw noise filtering, lens shading correction, white balance gain, and highlight recovery. The resample stage 62 may perform various operations to convert, resample, or scale image data received from raw processing stage 60 and may provide the output image data for buffering in memory. The noise stage 64 may, in various embodiments, implement a variety of modules, units, or components to perform various operations, functions, or tasks, in different orders, such as gamma/de-gamma mapping, color space conversion, temporal filtering, noise filtering, luma sharpening, and chroma noise reduction. The color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. In various embodiments, the back end scaling stage 68 may resample, transform and correct distortion on the fly as the ISP pipeline processes image data. Back end scaling stage 68 may, in various embodiments, include horizontal and vertical scaling components.

Figure 7:
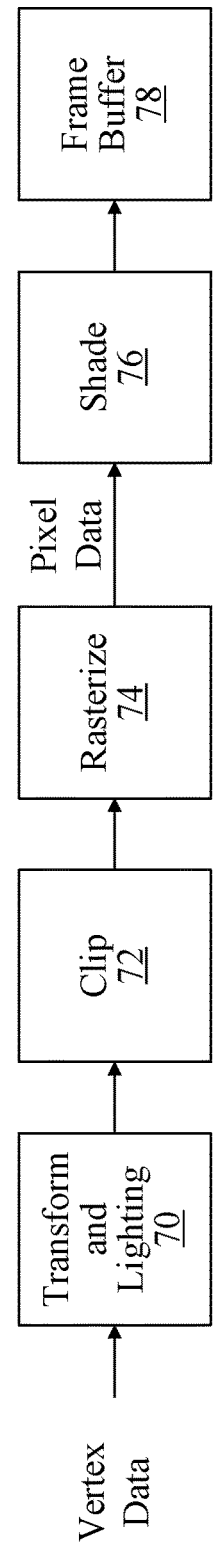
FIG. 7 is a block diagram of one embodiment of a portion of a graphics processor pipeline.

FIG. 7 is a block diagram illustrating a portion of one embodiment of graphics processing unit (GPU) pipeline. In the illustrated embodiment, the GPU pipeline may receive vertex data identifying the vertices of triangles forming an image component, and may include a transform and lighting stage 70, a clip stage 72, a rasterize stage 74, a shade stage 76, and a frame buffer stage 78. The stages 70-78 may be coupled in series as shown in FIG. 7, and may be clock gated and in retention until vertex data is received.

The transform and lighting stage 70 may involve processing lighting information for vertices received from an application based on defined light source locations, reflectance, etc., assembling the vertices into polygons (e.g., triangles), and/or transforming the polygons to the correct size and orientation based on position in a three-dimensional space. The clip stage 72 may involve discarding polygons or vertices that fall outside of a viewable area. The rasterize stage 74 may involve defining fragments or pixels within each polygon and assigning initial color values for each fragment, e.g., based on texture coordinates of the vertices of the polygon. The shade stage 76 may involve altering pixel components based on lighting, shadows, bump mapping, translucency, etc. Shaded pixels may be assembled into a frame buffer in the frame buffer stage 78.

Figure 8:
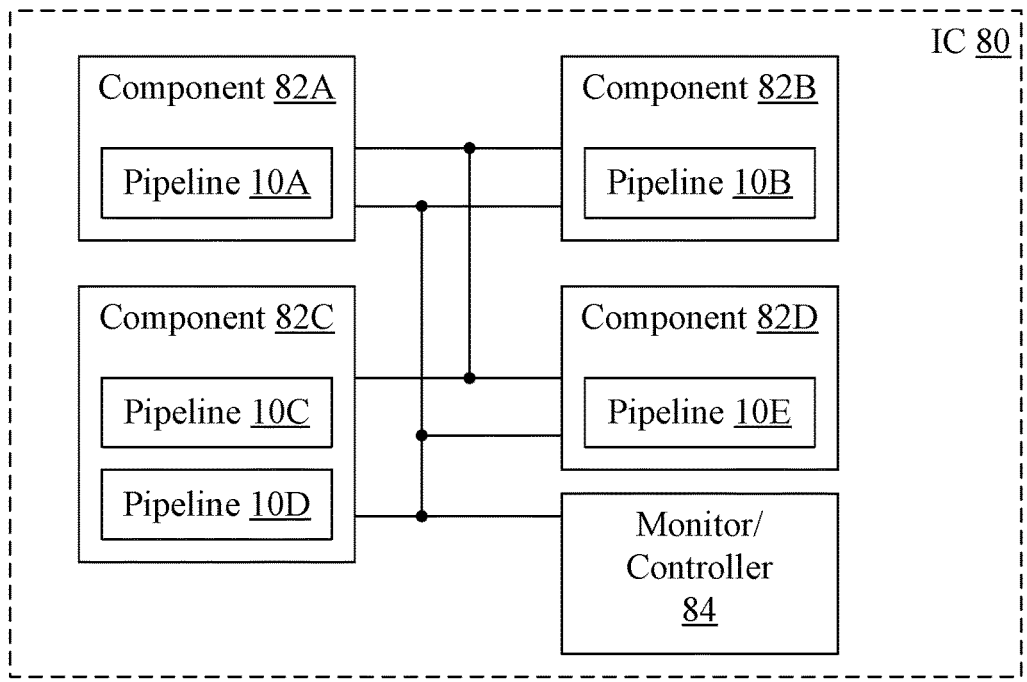
FIG. 8 is a block diagram of one embodiment of an integrated circuit.

FIG. 8 is a block diagram of one embodiment of an integrated circuit (IC) 80 that includes various components 82A-82D having pipelines 10A-10E similar to pipeline 10 shown in FIG. 1. That is, the pipelines 10A-10E may be clock gated and in retention until data arrives for processing, and they may be powered and ungated in rolling fashion. The components 82A-82D may be coupled to each other as desired to accomplish the operation of the IC 80. The components 82A-82D may include any components including display controllers implementing pipelines similar to those shown in FIGS. 3 and/or 4, processors including pipelines similar to that shown in FIG. 5, ISPs implementing pipelines similar to that shown in FIG. 6, GPUs implementing pipelines similar to those shown in FIG. 7, various peripherals or peripheral interface circuits, memory controllers, etc. As illustrated in component 82C having pipelines 10C-10D, a given component may have more than one pipeline similar to the pipeline 10. In other embodiments, the components themselves may be ICs in a system, a combination of internal IC components and external IC components may be implemented. For example, a portable communication device may include an SOC having various processors and peripherals, or multiple ICs implementing the processors and peripherals, as well as one or more of a WiFi chip, a cellular radio chip, a bluetooth chip, etc.

A monitor/controller circuit 84 is shown in FIG. 8. The monitor/controller circuit 84 may monitor the activity in the components 82A-82D, and may generate the lookahead enables and/or data valids for the pipelines in the various components based on the observed activity. Thus, the monitor/controller circuit 84 may serve as a central control point for the rolling power management of various components in an IC and/or system. The monitor/controller circuit 84 may be any combination of hardware circuitry, a processor executing firmware from a computer accessible storage medium or software from the computer accessible storage medium, programmable logic devices, etc.

In an embodiment, activity in one pipeline 10A-10E may be an indication that activity in another pipeline 10A-10E may be forth coming. For example, if data output by a first pipeline 10A-10E is typically next processed by a second pipeline 10A-10E, the first pipeline's activity may be an indicator that the second pipeline is soon to be active. Based on the latency of the first pipeline, the initiation of activity in the first pipeline, and the delay to power up the second pipeline for activity, the monitor/controller circuit 84 may be configured to predicate when the second pipeline should be powered up and to assert the lookahead enable to the second pipeline. In this manner, power up and power down may be implemented with little or no performance cost in some embodiments.

Figure 9:
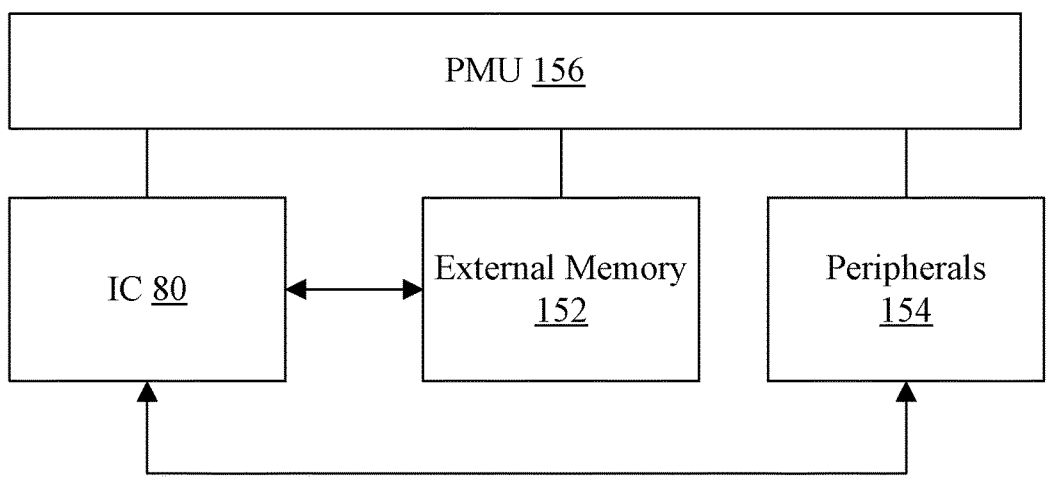
FIG. 9 is a block diagram of one embodiment of a system.

FIG. 9 is a block diagram of one embodiment of a system 150. In the illustrated embodiment, the system 150 includes at least one instance of the IC 80 coupled to one or more peripherals 154 and an external memory 152. A power management unit (PMU) 156 is provided which supplies the supply voltages to the IC 80 as well as one or more supply voltages to the memory 152 and/or the peripherals 154. In some embodiments, more than one instance of the IC 80 may be included (and more than one memory 152 may be included as well).

The PMU 156 may generally include the circuitry to generate supply voltages and to provide those supply voltages to other components of the system such as the IC 80, the memory 152, various off-chip peripheral components 154 such as display devices, image sensors, user interface devices, etc. The PMU 156 may thus include programmable voltage regulators, logic to interface to the IC 80 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 152 may include any type of memory. For example, the external memory 152 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 152 may include one or more memory modules to which the memory devices are mounted, such as single inline memory modules (SIMMs), dual inline memory modules (DIMMs), etc. Alternatively, the external memory 152 may include one or more memory devices that are mounted on the IC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a plurality of pipeline stage circuits;
a plurality of voltage regulators integrated into the integrated circuit with the plurality of pipeline circuits, each of the plurality of voltage regulators:
coupled to a respective pipeline stage circuit;
configured to supply a regulated supply voltage to the respective pipeline stage circuit; and
includes one or more energy storage components; and
a plurality of control circuits coupled to the plurality of pipeline stage circuits and the plurality of voltage regulators, wherein:
a given control circuit of the plurality of control circuits is coupled to an activity indicator for a given pipeline stage circuit of the plurality of pipeline circuits;
the given control circuit is configured to cause a given voltage regulator of the plurality of voltage regulators to supply power to the given pipeline stage circuit in response to the activity indicator indicating activity;
the given control circuit is configured to cause a clock to the given pipeline stage circuit to be gated in response to the activity indicator indicating no activity;
the given control circuit is configured to cause the clock to be ungated in response to the activity indicator indicating activity and further in response to an expiration of a delay from the power being supplied to the given power supply circuit; and
the gated clock is not toggling and the ungated clock is toggling.

2. The integrated circuit as recited in claim 1, wherein the delay is less than or equal to 5 clock periods of the ungated clock.

3. The integrated circuit as recited in claim 1, wherein:
a first pipeline stage circuit of the plurality of pipeline stage circuits is coupled a first activity indicator;
the first pipeline stage circuit is configured to process data provided to the first pipeline stage circuit to produce output data and a second activity indicator to a second pipeline stage circuit of the plurality of pipeline stage circuits;
a first control circuit of the plurality of control circuits is configured to cause a first voltage regulator of the plurality of voltage regulators to supply power to the first pipeline stage circuit responsive to the first activity indicator;
a second control circuit of the plurality of control circuits is configured to cause a second voltage regulator of the plurality of voltage regulators to supply power to the second pipeline stage circuit responsive to the second activity indicator; and
a first period of time in which power is supplied to the first pipeline stage circuit overlaps with a second period of time in which power is supplied to the second pipeline stage circuit.

4. The integrated circuit as recited in claim 3, wherein:
the first control circuit is configured to generate a third indicator prior to the second activity indicator;
the third indicator indicates that the second activity indicator is to activate; and
the second control circuit is configured to cause the second voltage regulator to supply power responsive to the third indicator prior to assertion of the second activity indicator.

5. The integrated circuit as recited in claim 1 further comprising:
a plurality of clock gater circuits coupled to respective pipeline stage circuits of the plurality of pipeline stage circuits, wherein the plurality of clock gater circuits are configured to ungate clocks to the respective pipeline stage circuits responsive to first enables from the plurality of control circuits.

6. The integrated circuit as recited in claim 1, wherein a first pipeline circuit of the plurality of pipeline stage circuits comprises a plurality of pipeline stages.

7. The integrated circuit as recited in claim 6, wherein a second pipeline circuit of the plurality of pipeline circuits is a single pipeline stage.

8. The integrated circuit as recited in claim 1, wherein:
the plurality of pipeline stage circuits are configured to process image data into pixels;
a data fetch stage is configured to fetch data from memory; and
the activity indication results from the data returning from memory to be processed.

9. The integrated circuit as recited in claim 1, wherein:
the plurality of pipeline stage circuits comprise execution stages of a processor; and
the activity indication indicates an instruction issued to the execution stages.

10. The integrated circuit as recited in claim 1, wherein the plurality of pipeline stage circuits comprise an image signal processor and the activity indication indicates camera data being provided to the image signal processor.

11. The integrated circuit as recited in claim 1, wherein the plurality of pipeline stage circuits comprise a graphics processor and the activity indication indicates vertex data is available for processing.

12. The apparatus as recited in claim 1 wherein at least one of the plurality of pipeline stage circuits is a single pipeline stage.

13. An apparatus comprising:
a plurality of pipeline stage circuits; and
a plurality of control circuits coupled to the plurality of pipeline stage circuits,
wherein:
a given control circuit of the plurality of control circuits is coupled to an activity indicator for a given pipeline stage circuit of the plurality of pipeline circuits;
the activity indicator indicates whether or not there is activity at an input to the given pipeline stage circuit;
the given control circuit of the plurality of control circuits is coupled to a second indicator that indicates, in advance of the activity indicator, that the activity indicator will be indicating activity at a subsequent point in time; and
the given control circuit is configured to cause power and clock to be supplied to the given pipeline stage circuit in response to the second indicator, wherein supplying the clock includes ungating the clock so that the clock begins to toggle to the given pipeline stage circuit after a delay expires from causing the power to be supplied to the given pipeline circuit, wherein the clock is gated prior to being ungated by the given control circuit, and wherein the gated clock is not toggling and the ungated clock is toggling; and
a controller circuit coupled to the plurality of control circuits and the plurality of pipeline stage circuits, wherein the controller circuit is configured to generate at least the second indicator for the given pipeline stage circuit.

14. The apparatus as recited in claim 13, wherein:
the given control circuit is configured to generate a third indicator indicating that a second activity indicator that indicates activity to a next pipeline stage circuit in series with the given pipeline circuit will be indicating activity; and
a second control circuit of the plurality of control circuit is configured to cause power and clock to be supplied to the next pipeline stage circuit in response to the third indicator.

15. The apparatus as recited in claim 13 further comprising:
a plurality of voltage regulators, each voltage regulator coupled to a respective pipeline circuit of the plurality of pipeline stage circuits, and each voltage regulator configured to supply power to the respective pipeline stage circuit responsive to an enable from a respective control circuit of the plurality of control circuits.

16. The apparatus as recited in claim 15, wherein each voltage regulator includes one or more energy storage components.

17. The apparatus as recited in claim 13, wherein:
the controller circuit is configured to generate the second indicator in response to monitoring activity in the plurality of pipeline stage circuits.

18. The apparatus as recited in claim 17, wherein the controller is configured to generate the activity indicator in response to monitoring activity in the plurality of pipeline stage circuits.

* * * * *